Figure 1:
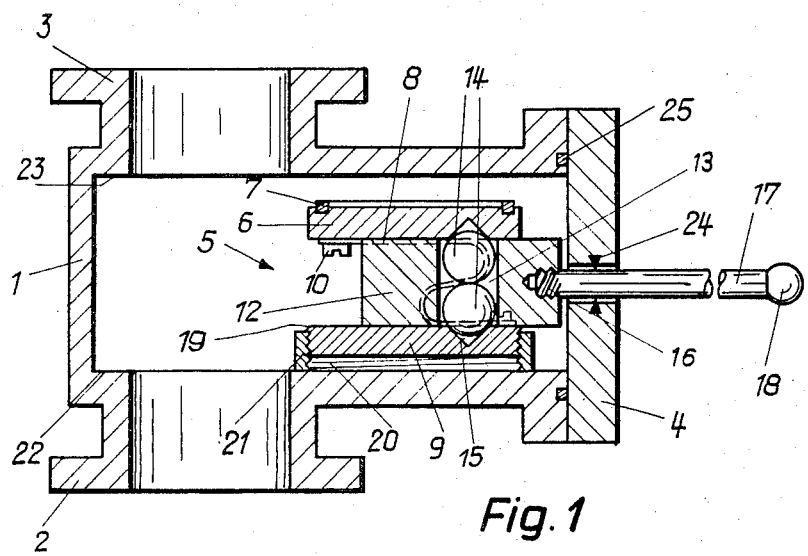

Feb. 13, 1968 — S. SCHERTLER — 3,368,792

GATE STOP VALVE

Filed Feb. 16, 1966

INVENTOR:
SIEGFRIED SCHERTLER
BY Robert H. Jacob
AGT.

United States Patent Office 3,368,792
Patented Feb. 13, 1968

3,368,792
GATE STOP VALVE
Siegfried Schertler, 9 Unterstrasse,
9230 Flawil, Switzerland
Filed Feb. 16, 1966, Ser. No. 541,409
Claims priority, application Switzerland, Mar. 3, 1965,
2,968/65
5 Claims. (Cl. 251—158)

The present invention relates to a gate stop valve whose obturator assembly is slidable by the aid of a push-pull rod and comprises two mutually superimposed plates, which are capable of being spread apart after said obturator assembly has been moved into the closing position, so that at least one of said plates is pressed with a tight seal as a valve plate against a seat.

Gate stop valves of this type are particularly suitable for gas and vacuum pipe lines, for which a very tightly sealing obturator member is required. With known gate stop valves of this type the two plates of obturator assembly are connected with one another by means of a link mechanism capable of spreading said plates apart by toggle lever action. It is a disadvantage of this construction, that when spreading apart and/or contracting the plates of such an obturator assembly one of said plates slides with high area pressure on its seat surface, so that a certain wear is inavoidable, particularly when for operation under a vacuum lubrication is out of question. By said wear fouling may be produced in the course of time which affects the seal of the valve plate on its seat.

The present invention has the primary object of overcoming the above disadvantages and of providing a gate stop valve wherein sliding of the plates of the obturator on their seats under high area pressure is obviated and consequential wear is eliminated.

With this and other objects in view which will become apparent later from this specification and the accompanying drawings I provide a gate stop valve comprising in combination: a casing having an inlet port and an outlet port, an obturator assembly slidably arranged in said casing in operative relationship to said ports, said obturator assembly comprising a valve plate and a support plate capable of being spread apart and of being pressed against seat surfaces on the interior of said casing surrounding said inlet port and outlet port, respectively, tension springs connecting said valve plate and support plate with one another, a cage arranged between said two plates and having a bore extending from end to end between said two plates, a pair of roller bodies arranged with clearance in said bore one on top of the other and each having a diameter exceeding half the length of said bore, juxtaposed recesses being provided in said two plates, in which said roller bodies rest in the open position of the gate, and a push-pull rod attached to said case and passing sealed to the outside of said casing and, when pushed into said casing, forcing said roller bodies out of their recess and pressing said plates against their seats, so as to close said gate tightly.

Preferably said roller bodies are balls and said tension springs are leaf springs. Preferably at least one adjustment means is provided for adjusting the effective height of said obturator assembly in the spread-out position of said plates. This means may comprise a screw-tapped ring screwed on an external screwthread provided on said support plate.

Figure 2:
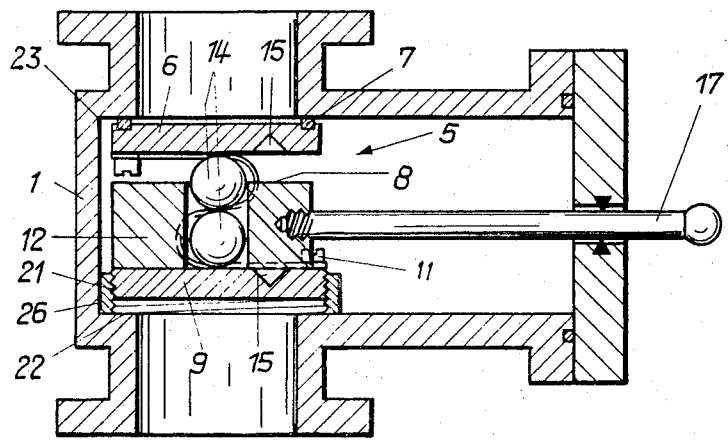

These and other features of my said invention will be clearly understood from the following description of a preferred embodiment illustrated by way of example in the accompanying drawing, in which:

FIG. 1 is a longitudinal section of a gate stop valve according to the present invention in the open position, and FIG. 2 is a corresponding section in the closed position.

The gate stop valve illustrated comprises a casing 1 provided with two connecting ports 2 and 3 and closed by a lid 4. Within the casing 1 a multi-component obturator assembly 5 is mounted slidably. This obturator assembly comprises a valve plate 6, which is provided with an annular seal 7 and is pulled towards a support plate 9 by two S-shaped leaf springs 8. The ends of the two leaf springs 8, which in the drawing lie one behind the other, are fixed by means of screws 10 and 11, respectively, to the valve plate 6 and support plate 9, respectively. Between the two plates 6 and 9 and the two leaf springs 8, a prismatic ball-cage 12 is arranged, which has a bore 13 extending through the whole of it, wherein two balls 14 are arranged, whose diameters are only slightly smaller than that of the bore 13, but are considerably larger than half the length of said bore 13. In the open position of the gate these balls 14 (FIG. 1) rest in two juxtaposed recesses 15 of the two plates 6 and 9.

To the ball-cage 12 the inner, screw-threaded end 16 of a push-pull rod 17 is attached, which rod passes through the lid 4 and is provided at its outer end with an operating knob 18. The support plate 9 is provided at its circumference with an external screw thread 19 which is screwed into a corresponding internal screw tapping 20 of an adjustment ring 21. At the inner end of the port 2 a seat 22 for the adjustment ring 21, and at the inner end of the port 3 a seat 23 for the valve plate 6 are provided. A gland 24 serves for sealing the push-pull rod 17 in the lid 4, and a seal 25 serves for sealing the lid 4 on the casing 1, to which it is attached by means of screws (not shown).

In order to close the gate, the obturator body 5 is pushed between the ports 2 and 3 by means of the push-pull rod 17. Then the obturator assembly remains firstly in its contracted position shown in FIG. 1. When the adjustment ring 21 finally abuts the point marked 26 in FIG. 2 of the casing 1 and the push-pull rod 17 is pushed further inward, the ball-cage 12 forces the balls 14 to emerge from the recesses 15, so that they spread the two plates 6 and 9 apart against the bias of the springs 8, while the balls 14 roll on the plates 6 and 9 and upon one another, so that there is very little friction and wear is prevented. In the spreadout position thus reached and illustrated in FIG. 2 of the obturator assembly 5, the valve plate 6 is pressed with its seal 7 firmly on the valve seat 23, whereby an extraordinarily good sealing effect is attained. Obviously also by the support plate 9 and the adjustment ring 9 being forced on the seat 22 a sealing effect is attained, which may be increased, if desired, by providing a sealing ring also there. The primary object of the adjustment ring 21 is however, to adjust the effective height of the obturator assembly 5 in its spread-out position in accordance with the distance of the seats 22 and 23 from each other in such a manner that the seal 7 is compressed with the force required in the closed position of the gate.

It is clear that, when opening the gate, firstly the ball-cage 12 is retracted so far that the balls 14 re-enter and rest in the recesses 15, and the springs 8 withdraw the valve plate 6 from its seat 23 and draw it towards the ball-cage 12, and that subsequently the obturator body as a whole is moved into the open position by the push-pull rod 17.

While I have herein described and illustrated in the accompanying drawing what may be considered a typical and particularly useful embodiment of my said invention, I wish it to be understood that I do not limit myself to the particular details and dimensions described and illustrated; for obvious modifications will occur to a person skilled in the art.

For example, instead of the adjustment ring 21, some adjustment screws could be provided in the vicinity of the edge of the support plate 9, whose heads rest on the seat 22 in the closed position of the gate. Instead of the two balls 14 alternatively two rollers could be provided with consequential alteration of the cross section of the bore 13. With large gate stop valves conveniently several pairs of balls or rollers are to be provided. Instead of the leaf springs 8 obviously tension springs of other shape could be provided between the plates 6 and 9. In order to limit the path of the push-pull rod 17 and of the ball cage 12 in the closing direction, an abutment may be provided, so that when closing the gate, the balls 14 remain automatically in the middle of the plates 6 and 9.

What I claim as my invention and desire to secure by Letters Patent, is:

1. A gate stop valve comprising in combination: a casing having an inlet port and an outlet port, an obturator assembly slidably arranged in said casing in operative relationship to said ports, said obturator assembly comprising a valve plate and a support plate capable of being spread apart and of being pressed against seat surfaces on the interior of said casing surrounding said inlet port and outlet port, respectively, tension springs connecting said valve plate and support plate with one another, a cage arranged between said two plates and having a bore extending from and to and between said two plates, a pair of roller bodies arranged with clearance in said bore one on top of the other and each having a diameter exceeding half the length of said bore, juxtaposed recesses being provided in said two plates, in which said roller bodies rest in the open position of the gate, and a push-pull rod attached to said cage and passing sealed to the outside of said casing, and, when pushed into said casing, forcing said roller bodies out of their recesses and pressing said plates against their seats, so as to close said gate tightly.

2. A gate stop valve as claimed in claim 1, wherein said roller bodies are balls.

3. A gate stop valve as claimed in claim 1, wherein said tension springs are leaf springs.

4. A gate stop valve as claimed in claim 1, comprising at least one adjustment means for adjusting the effective height of said obturator assembly in the spread-out position of said plates.

5. A gate stop valve as claimed in claim 4, wherein said adjustment means comprises a screw-tapped ring screwed on an external screw thread provided on said support plate.

References Cited

UNITED STATES PATENTS

| | | | |
|---|---|---|---|
| 2,676,780 | 4/1954 | Wheatley | 251—204 |
| 2,977,086 | 3/1961 | Heiner | 251—167 |
| 3,036,813 | 5/1962 | Headrick | 251—199 XR |
| 3,038,692 | 6/1962 | Holmes | 251—167 |

FOREIGN PATENTS 929,920    7/1955    Germany.

WILLIAM F. O'DEA, *Primary Examiner.*

H. W. WEAKLEY, *Examiner.*